(12) United States Patent
Ben Ahmed et al.

(10) Patent No.: US 10,875,382 B2
(45) Date of Patent: Dec. 29, 2020

(54) WASTE HEAT UTILIZATION SYSTEM FOR AN ELECTRIC VEHICLE

(71) Applicant: Mahle International GmbH, Stuttgart (DE)

(72) Inventors: Fahmi Ben Ahmed, Stuttgart (DE); Matthias Jung, Stuttgart (DE); Sascha Lindauer, Schorndorf (DE); Hans-Ulrich Steurer, Stuttgart (DE)

(73) Assignee: Mahle International GmbH (DE)

( * ) Notice: Subject to any disclaimer, the term of this patent is extended or adjusted under 35 U.S.C. 154(b) by 163 days.

(21) Appl. No.: 15/878,389

(22) Filed: Jan. 23, 2018

(65) Prior Publication Data

US 2018/0208014 A1 Jul. 26, 2018

(30) Foreign Application Priority Data

Jan. 25, 2017 (DE) .......................... 10 2017 201 202

(51) Int. Cl.
*B60H 1/00* (2006.01)
*B60H 1/32* (2006.01)
(Continued)

(52) U.S. Cl.
CPC ..... *B60H 1/00392* (2013.01); *B60H 1/00885* (2013.01); *B60H 1/00899* (2013.01);
(Continued)

(58) Field of Classification Search
CPC ............ B60H 1/00392; B60H 1/00885; B60H 1/143; B60H 1/2225; B60H 1/3211;
(Continued)

(56) References Cited

U.S. PATENT DOCUMENTS

| | | | | |
|---|---|---|---|---|
| 6,640,889 | B1 * | 11/2003 | Harte | B60H 1/00885 165/202 |
| 7,797,954 | B2 * | 9/2010 | Duhme | B60H 1/00278 62/184 |
| 8,215,432 | B2 * | 7/2012 | Nemesh | B60H 1/00278 180/68.2 |
| 8,516,847 | B2 * | 8/2013 | Koh | F24F 5/0017 62/182 |

(Continued)

FOREIGN PATENT DOCUMENTS

DE 102013206630 A1 10/2014

OTHER PUBLICATIONS

German search report dated Jul. 3, 2018.
English abstract for DE102013206630.

*Primary Examiner* — Tho V Duong
*Assistant Examiner* — Raheena R Malik
(74) *Attorney, Agent, or Firm* — Fishman Stewart PLLC (57) ABSTRACT

A waste heat utilization system for an electric vehicle having an electric motor and a battery may include a first cooling circuit in which a first coolant circulates and having arranged therein the electric motor, a first direct heat exchanger for discharging heat from the first coolant into surroundings of the system, and a first delivery device for driving the first coolant. The system may also include a second cooling circuit in which a second coolant circulates and having arranged therein the battery and a second delivery device for driving the second coolant. The system may also include an air conditioning circuit in which a working medium circulates, and having arranged therein a compressor, condenser, and evaporator. The system may further include first and second chillers by which heat may be transferrable from the first and second cooling circuits into the air conditioning circuit, and first and second heat exchangers incorporated in one of the first and second cooling circuits for discharging heat into the surroundings.

20 Claims, 7 Drawing Sheets

(51) Int. Cl.
*B60H 1/14* (2006.01)
*B60H 1/22* (2006.01)

(52) U.S. Cl.
CPC .......... *B60H 1/143* (2013.01); *B60H 1/2225* (2013.01); *B60H 1/3211* (2013.01); *B60H 1/32284* (2019.05); *B60H 2001/00928* (2013.01); *B60H 2001/00949* (2013.01); *B60H 2001/2296* (2013.01)

(58) Field of Classification Search
CPC .......... B60H 1/323; B60H 2001/00928; B60H 2001/00949; B60H 2001/2296; B60H 1/32284; B60H 1/00899
USPC ..................................................... 165/41, 43
See application file for complete search history.

(56) References Cited

U.S. PATENT DOCUMENTS

| | | | |
|---|---|---|---|
| 10,173,491 B2 * | 1/2019 | Kim | B60H 1/00007 |
| 10,343,483 B2 * | 7/2019 | Kim | B60H 1/00385 |
| 10,486,493 B2 * | 11/2019 | Kim | B60H 1/00899 |
| 10,562,367 B2 * | 2/2020 | Oh | B60H 1/323 |
| 2012/0247716 A1 * | 10/2012 | Galtz | B60H 1/00278 |
| | | | 165/42 |
| 2013/0020398 A1 * | 1/2013 | Goto | B60H 1/00285 |
| | | | 237/12.4 |
| 2013/0269911 A1 * | 10/2013 | Carpenter | F28D 1/0408 |
| | | | 165/104.13 |
| 2017/0106725 A1 * | 4/2017 | Kim | B60H 1/00428 |
| 2018/0264913 A1 * | 9/2018 | Enomoto | B60H 1/00899 |
| 2018/0361828 A1 * | 12/2018 | Kato | F25B 5/04 |

\* cited by examiner

WASTE HEAT UTILIZATION SYSTEM FOR AN ELECTRIC VEHICLE

CROSS-REFERENCE TO RELATED APPLICATIONS

This application claims priority to German Patent Application No. DE 10 2017 201 202.1, filed on Jan. 25, 2017, the contents of which are incorporated herein by reference.

TECHNICAL FIELD

The present invention relates to a waste heat utilization system for an electric vehicle and to an electric vehicle with such a waste heat utilization system.

BACKGROUND

In electric vehicles, i.e. in electrically driven vehicles, the rechargeable battery that is present for driving the electric motor is utilised for supplying various auxiliary units, i.e. electrical consumers, with electric energy. Since in electric vehicles no waste heat generated by an internal combustion engine is available for heating the vehicle interior, an electrically operated heating device is required which likewise draws its electric heating power required for the operation from the battery of the electric vehicle. However, this electric energy is no longer available for driving the electric motor, which can significantly reduce the range of the electric vehicle.

SUMMARY

It is therefore an object of the present invention to create a waste heat utilization system for an electric vehicle with which the problem explained above does no longer occur or only to a greatly limited degree. In particular it is an object of the present invention to show new ways in the development of waste heat utilization systems for electric vehicles.

According to the invention, this problem is solved through the subject of the independent patent claims. Advantageous embodiments are subject of the dependent patent claims.

Accordingly, the basic idea of the invention is to integrate the cooling circuits that are present in the electric vehicle for cooling the battery and the electric motor together with an air conditioning circuit that is present in the electric vehicle for tempering the vehicle in a waste heat utilization system interior in such a manner that the waste heat generated by the battery and/or by the electric vehicle can be utilised in order to heat the vehicle interior when required but can also be effectively discharged into the surroundings of the electric vehicle. In the case that the waste heat from the electric motor and/or the battery is to be utilised for heating the vehicle interior, the waste heat utilization system according to the invention, following the operating principle of a heat pump, and provide heat from one of the two cooling circuits.

A waste heat utilization system for an electric vehicle according to the invention, which comprises an electric motor for driving the electric vehicle and a battery for supplying the electric motor with electric energy, has a first cooling circuit. The first cooling circuit serves for cooling the electric motor. In the first cooling circuit, a first coolant circulates during the operation of the waste heat utilization system. In the first cooling circuit, the electric motor to be cooled, a first direct heat exchanger for discharging heat from the first coolant into the surroundings of the waste heat utilization system, and a first delivery device for driving the first coolant in the first cooling circuit are arranged.

Furthermore, the waste heat utilization system according to the invention comprises a second cooling circuit for cooling the battery. During the operation of the waste heat utilization system, a second coolant circulates in the second cooling circuit. In the second cooling circuit the battery to be cooled and a second delivery device for driving the second coolant in the second cooling circuit are arranged. Apart from this, the waste heat utilization system comprises an air conditioning circuit for air conditioning a vehicle interior of the electric vehicle. In the air conditioning circuit, a working medium circulates during the operation of the waste heat utilization system. In the air conditioning circuit, a compressor for compressing the working medium, a condenser for condensing the working medium and an evaporator for evaporating the working medium are arranged.

The waste heat utilization system, furthermore, comprises a first chiller, by means of which heat from the first cooling circuit is transferrable into the air conditioning circuit, and a second chiller, by means of which heat is transferrable from the second cooling circuit into the air conditioning circuit. By means of the two chillers, waste heat of the electric motor or of the battery can be transferred into the air conditioning circuit. The heat introduced into the air conditioning circuit in this manner can be given off to the vehicle interior if required in order to heat the same or, if such a heating should not take place, given off to the surroundings of the waste heat utilization system or of the electric vehicle. A first and a second direct heat exchanger, which are arranged in the first or second cooling circuit, serve for discharging heat into the surroundings of the waste heat utilization system in the case that the vehicle interior should not be heated further.

The use of an electric heating device for heating the vehicle is thus optionally required only in particular when the heat provided by the air conditioning circuit is not sufficient to heat the vehicle interior as desired.

According to an advantageous further development, the condenser is designed as direct heat exchanger, by means of which heat from the air conditioning circuit is transferrable into the surroundings of the waste heat utilization system. The design as direct heat exchanger allows technically configuring the waste heat utilization system in a particularly simple manner. In particular, a special heating circuit, by means of which the waste heat provided by the two cooling circuits, can be thermally coupled into the vehicle interior, can be omitted. Instead, the entire heat transfer from the two cooling circuits into the vehicle interior takes place directly via the air conditioning circuit and via a condenser arranged in the air conditioning circuit.

Apart from this, the waste heat utilization system, in a preferred embodiment, comprises a heating circuit in which a heating medium circulates and a third delivery device arranged in the heating circuit for driving the heating medium and a third direct heat exchanger arranged in the heating circuit for giving off heat from the heating medium to the vehicle interior. With this embodiment, the condenser that is present in the air conditioning circuit is designed as indirect heat exchanger, by means of which heat from the air conditioning circuit can be transferred into the heating circuit. The design of the condenser as indirect heat exchanger, which gives off heat not directly to the air of the vehicle interior but transfers the same to the heating medium circulating in the heating circuit, allows a particularly flexible thermal management in the waste heat utilization system according to the invention. In particular, various parameters such as for example different ambient temperatures in the surroundings of the electric vehicles and different temperature levels in the vehicle interior can be reacted to. At the same time, the amount of waste heat that is currently generated by the battery and by the electric vehicle can be flexibly taken into account. Depending on heat requirement in the vehicle interior, waste heat generated by battery and electric motor can also be specifically given off to the surroundings of the electric vehicle.

In the result, a high temperature in the vehicle interior with low consumption of electric energy from the battery can be achieved in different operating states of most diverse operating parameters and with different ambient states with different ambient parameters such as for example said ambient temperature in the vehicle interior. In addition to this, the waste heat utilization system introduced here makes possible using the battery as a heat accumulator for buffer storing waste heat. When the battery for example is charged with the help of an electric charging station, the temperature of the battery, with suitable activation of the charging process, can be increased to a high but still permissible level. Because of the high mass of the battery and the high heat capacity connected with this a significant quantity of heat can thus be stored in the battery. This heat, which is buffer-stored in the battery, can be introduced into the vehicle interior by means of the waste heat utilization system according to the invention later on, typically while the electric vehicle is in driving mode, in order to heat said vehicle interior.

According to this embodiment, the second direct heat exchanger can be preferentially designed in such a manner that it can be optionally incorporated in the second cooling circuit for discharging heat from the second coolant into the surroundings of the waste heat utilization system or into the heating circuit for discharging heat from the heating medium into the surroundings of the waste heat utilization system. When heat is to be discharged from the second cooling circuit into the surroundings of the waste heat utilization system, the second heat exchanger can be incorporated in the second cooling circuit. This can be the case for example when particularly much waste heat is generated by the battery and introduced into the second cooling circuit. If, by contrast, heat is to be discharged from the heating circuit into the surroundings of the waste heat utilization system, the second heat exchanger can be incorporated in the heating circuit. This can be the case, for example, when excess heat is present in the heating circuit which is not to be introduced into the vehicle interior. With this embodiment it is thus not necessary to provide a separate heat exchanger in each case both for the second cooling circuit and also for the heating circuit. This is accompanied by significant cost savings. It is conceivable in a further development of this embodiment to fluidically connect the second heat exchanger with the second cooling circuit and the heating circuit so that it is incorporated in the heating circuit as well as in the second cooling circuit.

Depending on which circuit holds more waste heat to be discharged in the surroundings, the second direct heat exchanger can thus be suitably incorporated in the respective circuit. This makes possible a flexible discharge of heat in the surroundings of the waste heat utilization system if required.

Particularly preferably, a first operating state is adjustable in the waste heat utilization system. The first operating state primarily serves in order to ensure, on the one hand, the required cooling of the battery in high ambient temperatures and on the other hand also cooling the vehicle interior by means of the air conditioning circuit. Heating the vehicle interior, by contrast, is not the aim in the first operating state. In the first operating state, the second chiller therefore transfers the waste heat given off by the battery to the second coolant from the second coolant to the working medium. The condenser arranged in the air conditioning circuit and designed as indirect heat exchanger transfers this heat at least partly from the working medium further to the heating medium. Since because of the high ambient temperature a heating of the vehicle interior is not required, the second direct heat exchanger for discharging heat from the heating circuit into the surroundings of the waste heat utilization system is integrated in the heating circuit so that it is flowed through by the heating medium. By way of the second direct heat exchanger, heat can thus be given off from the heating medium to the surroundings of the waste heat utilization system. The third heat exchanger arranged in the heating circuit, which actually serves for transferring heat into the vehicle interior, is fluidically bridged or deactivated, so that no heating medium flows through this heat exchanger.

Likewise, the first chiller, in the first operating state, is also fluidically bridged so that no heat exchange between the air conditioning circuit and the first cooling circuit occurs. The first cooling circuit with the electric motor is thus decoupled from the air conditioning circuit. The waste heat generated by the electric motor if applicable is therefore given off into the surroundings of the electric vehicle via the first direct heat exchanger. The evaporator present in the air conditioning circuit is flowed through by the working medium for absorbing heat from the vehicle interior of the electric vehicle. By means of the mentioned measures, the desired cooling of the battery and of the vehicle interior is achieved.

In a further preferred embodiment, a second operating state is adjustable in the waste heat utilization system. Typically, the waste heat utilization system is in a second operating state when the electric vehicle with the waste heat utilization system is connected at high ambient temperatures to an electrical charging station for charging the electric battery. In this case, waste heat is generated by the battery but not by the electric motor or only to a minor degree. Since with high ambient temperatures a heating of the vehicle interior is not required, the second operating state is primarily designed for discharging the heat generated by the battery during the course of the charging process into the surroundings of the electric vehicle. In the second operating state, the second chiller therefore transfers heat from the second coolant to the working medium, and the condenser arranged in the air conditioning circuit transfers this heat at least partly from the working medium further to the heating medium. In the second operating state, the second direct heat exchanger for discharging heat from the heating circuit into the surroundings of the waste heat utilization system is also integrated in the heating circuit so that it is flowed through by the heating medium. The third heat exchanger arranged in the heating circuit, just as in the second operating state, is also bridged or deactivated in the second operating state so that no heating medium flows through this heat exchanger. Likewise, the first chiller is fluidically bridged or deactivated so that no heat exchange occurs between the air conditioning circuit and the first cooling circuit. Since no vehicle occupant is typically present in the vehicle interior during the charging process of the electric battery, no cooling of the vehicle interior by means of the air conditioning circuit is required even with high ambient temperatures. For this reason, in contrast with the previously explained first operating state, the evaporator is also fluidically bridged and deactivated in this manner in the second operating state so that no working medium can flow through the evaporator. Thus, no heat is transferred from the vehicle interior to the working medium of the air conditioning circuit.

Since the electric vehicle for charging the battery is connected to the charge station, i.e. parked off, the electric motor typically does not generate any quantity of waste heat or only a negligibly small amount. For this reason, it is proposed in an advantageous further development to deactivate the first delivery device in the second operating state so that no first coolant circulates in the cooling circuit. In other words, the first cooling circuit is switched off. By deactivating the first delivery device, further electric energy can be saved. In this way, the charging process of the battery can be significantly accelerated.

According to a further preferred embodiment, a third operating state is adjustable in the waste heat utilization system. The third operating state is typically adjusted in the waste heat utilization system when the battery, as with the second operating state, typically has to be cooled during a charging process. In contrast with the second operating state the third operating state is thus primarily employed when the ambient temperature of the surroundings of the electric vehicle or of the waste heat utilization system is significantly lower than during the first operating state so that the vehicle interior, in contrast with the second operating state, is to be heated. In this way it is ensured that following the completion of the charging process the vehicle interior is already suitably tempered. In the third operating state, the second chiller transfers heat from the second coolant to the working medium and the condenser arranged in the air conditioning circuit transfers heat from the working medium to the heating medium. In this embodiment, the evaporator arranged in the air conditioning circuit is flowed through by working medium for absorbing heat from the vehicle interior of the electric vehicle. In contrast with the second operating state, the third direct heat exchanger arranged in the heating circuit is flowed through by the heating medium in the third operating state so that heat to be given off to the vehicle interior is extracted from the heating medium in the third heat exchanger. In this way, the vehicle interior is heated as desired. Excess heat, which is not needed for the tempering or heating of the vehicle interior can, analogously to the second operating state, be given off to the surroundings of the waste heat utilization system by means of the second direct heat exchanger.

Particularly practically, the second direct heat exchanger can be additionally switched into the heating circuit if required in the third operating state for discharging heat from the heating circuit into the surroundings of the waste heat utilization system.

According to a further preferred embodiment, a fourth operating state is adjustable in the waste heat utilization system. The fourth operating state is typically adjusted in particular when the vehicle interior at very low ambient temperatures, typically of 10° C. and less, is to be heated by means of waste heat generated by the electric motor. Typically, the fourth operating state is thus adjusted in the driving mode of the electric vehicle at low ambient temperatures. In the fourth operating state, the first chiller transfers heat generated by the electric motor and absorbed in the first cooling circuit, from the first coolant to the working medium. The second chiller is deactivated so that no heat is transferred from the second coolant to the working medium. In this embodiment, the condenser arranged in the air conditioning circuit transfers heat from the working medium to the heating medium. The evaporator arranged in the air conditioning circuit, by contrast, is fluidically bridged or deactivated, so that no working medium flows through the evaporator. An undesirable cooling of the vehicle interior by the air conditioning circuit in the fourth operating state is prevented in this way. The third direct heat exchanger arranged in the heating circuit is flowed through by heating medium in this embodiment, so that heat is extracted from the heating medium in the third heat exchanger to be given off to the vehicle interior.

According to a further preferred embodiment, a fifth operating state is adjustable in the waste heat utilization system. The fifth operating state is typically adjusted in particular when the vehicle interior at very low ambient temperatures, typically of 10° C. and less, is to be heated by means of waste heat generated by the battery. Typically, the firth operating state is thus adjusted in a parked-off state of the electric vehicle, typically just after the motor vehicle has been parked off. In this case, the waste heat incurred in the driving mode is at least temporarily stored in the battery which, because of its high mass has a high heat capacity and, following the operating principle of a heat accumulator, and can thus be accessed. In the fifth operating state, the second chiller transfers heat from the second coolant to the working medium. The first chiller, by contrast, is deactivated because of the switched-off electric motor, so that no heat is transferred from the first coolant to the working medium. In this embodiment, the condenser arranged in the air conditioning circuit transmits heat from the working medium to the heating medium. The evaporator arranged in the air conditioning circuit, by contrast, is fluidically bridged so that no working medium flows through the evaporator. An undesirable cooling of the vehicle interior by means of the air conditioning circuit in the fifth operating state is avoided in this way. The third direct heat exchanger arranged in the heating circuit is flowed through by the heating medium so that in the third heat exchanger heat is extracted from the heating medium to be given off to the vehicle interior. In this way, the vehicle interior is heated as desired.

The invention, furthermore, relates to an electric vehicle with an electric motor and with a battery for supplying the electric motor with electric energy. Apart from this, the electric vehicle comprises a waste heat utilization system according to the invention which has been introduced above. For this charging waste heat, the waste heat utilization system is operatively connected to the electric motor and/or the battery. The advantages of the waste heat utilization system explained above are therefore transferred also to the electric vehicle according to the invention.

Further important features and advantages of the invention are obtained from the subclaims, from the drawings and from the associated figure description by way of the drawings.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference characters relate to same or similar or functionally same components.

BRIEF DESCRIPTION OF THE DRAWINGS

It shows, in each case schematically.

DETAILED DESCRIPTION

Figure 1:
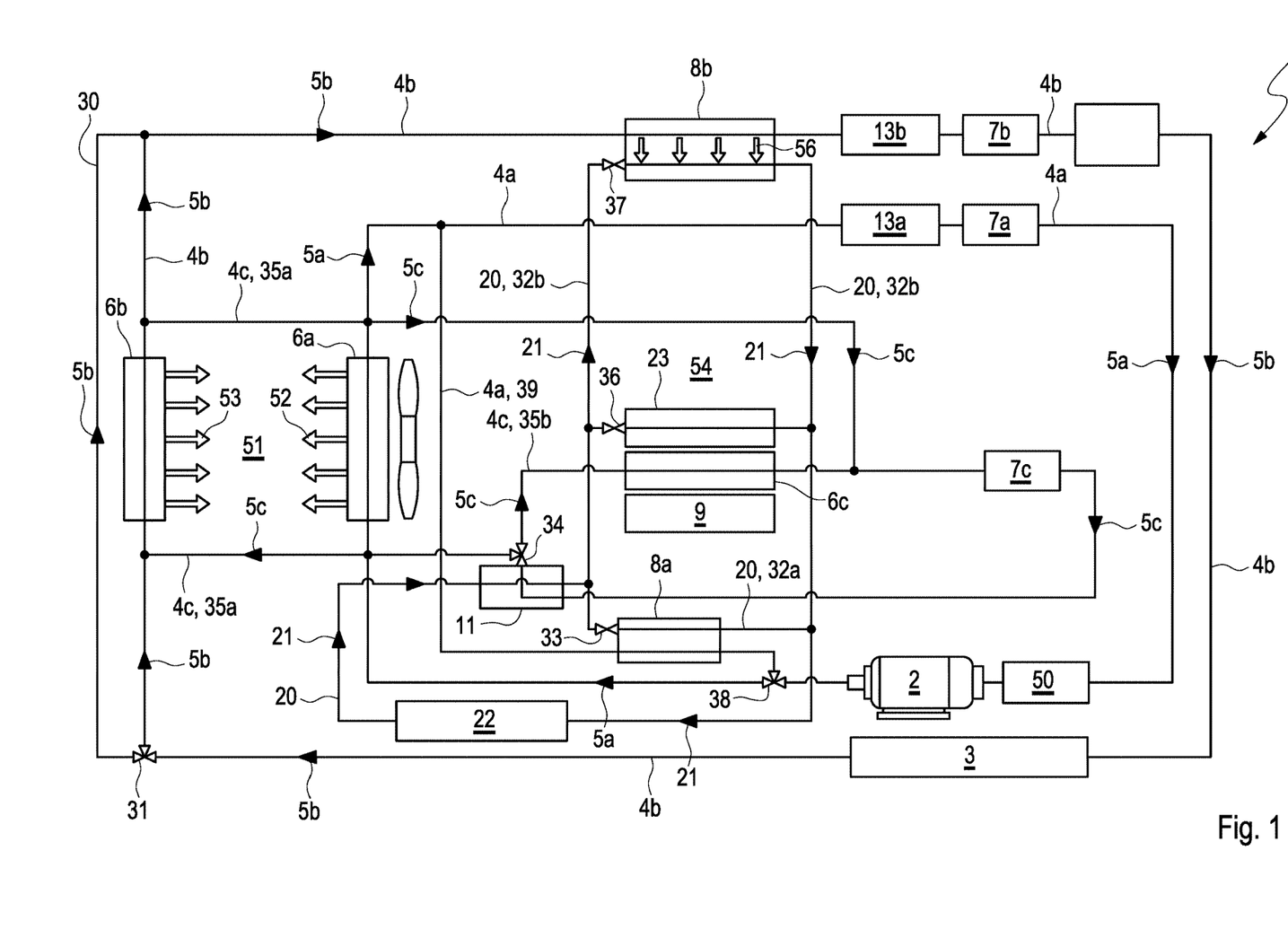
FIG. 1 a first example of a waste heat utilization system according to the invention with a condenser designed as indirect heat exchanger in a circuit diagram-like representation, FIG. 2-6 the waste heat utilization system of FIG. 1 in five different operating states, FIG. 7 a second example of a waste heat utilization system according to the invention with a condenser designed as direct heat exchanger in a circuit diagram-like representation.

FIG. 1 exemplarily shows the construction of a waste heat utilization system 1 according to the invention for an electric vehicle in a schematic, circuit diagram-like representation. The electric vehicle comprises an electric motor 2 for driving the electric vehicle and a battery 3 for supplying the electric motor 2 with electric energy. The battery 3 is of a rechargeable design so that in a discharged state it can be electrically recharged at an electric charging station (not shown). The waste heat utilization system 1 furthermore comprises a first cooling circuit 4a for cooling the electric motor 2 including power electronics 50 which can comprises more than one power transistor (not shown). During the operation of the waste heat utilization system 1, a first coolant 5a circulates in the first cooling circuit 4a. In addition to the electric motor to be cooled, a first direct heat exchanger 6a is provided in the first cooling circuit 4a for discharging heat from the first coolant 5a into the surroundings 51 of the waste heat utilization system 1 (see arrows 52). A first delivery device 7a serves for driving the first coolant 5a in the first cooling circuit 4a.

Apart from this, the waste heat utilization system 1 comprises a second cooling circuit 4b for cooling the battery 3. A second coolant 5b circulates in the second cooling circuit 4b during the operation of the waste heat utilization system 1. In the second cooling circuit 4b, a second delivery device 7b for driving the second coolant 5b is arranged in the second cooling circuit 6b in addition to the battery 2 to be cooled. According to FIG. 1, a second direct heat exchanger 6b for discharging heat from the second coolant 5b into the surroundings 51 of the waste heat utilization system 1 (see arrows 53) can be connected into the cooling circuit 4b which for this purpose is flowed through by the second coolant 5b. The two heat exchangers 6a, 6b can be designed as conventional radiators or heat exchangers. In the first and in the second cooling circuit 4a, 4b an expansion tank 13a, 13b can be arranged in each case for the first and second coolant 5a, 5b. For the first and the second coolant 5a, 5b and also for the heating medium 5c, the same substance can be used so that the two coolants differ only in their temperature level. The first coolant 5a of the first cooling circuit 4a typically has a higher temperature level than the second coolant 5b of the second cooling circuit 4b.

Furthermore, the waste heat utilization system 1 comprises an air conditioning circuit 20 for air conditioning a vehicle interior of the electric vehicle which is not shown in more detail in the figures and marked with the reference number 54. During the operation of the waste heat utilization system 1, a working medium 21 circulates in the air conditioning circuit 20. According to FIG. 1, a compressor 22 for compressing the working medium 21, a condenser 11 for condensing the working medium 1 and an evaporator 23 for evaporating the working medium 21 subject to absorbing heat from the vehicle interior 54 is arranged in the air conditioning circuit 20 in the known manner.

Furthermore, the waste heat utilization system 1 comprises a first chiller 8a, by means of which heat can be transferred from the first cooling circuit 4a into the air conditioning circuit 20. Furthermore, the waste heat utilization system 1 comprises a second chiller 8b, by means of which heat can be transferred from the second cooling circuit 4b into the air conditioning circuit 20. The two chillers 8a, 8b are arranged in a fluidic parallel connection. To this end, the first chiller 8a is arranged in a first fluid conducting path 32a and the second chiller 8b in a second fluid conducting path 32b, which is freshly connected parallel to the first fluid conducting path 32.

By means of an electric heating device 9, which draws electric energy from the battery 3, the vehicle interior 54 can also be electrically heated if required. The electric heating device 9 can also be provided in the waste heat utilization system 1 only optionally. The electric heating device 9 can be realised in such a manner that it directly heats the air that is present in the vehicle interior 54 so that the temperature of the same increases. Alternatively to this, the electric heating device 9 can also be integrated in the heating circuit 4c so that the heating medium 5c is heated. The heating medium then gives off more heat to the vehicle interior 54 as a result of which the temperature of the air likewise increases as desired.

In the example shown in FIG. 1, the waste heat utilization system 1 also comprises a heating circuit 4c for heating the vehicle interior 54 with heat from the two cooling circuits 4a, 4b. A heating medium 5c circulates in the heating circuit 4c. A third delivery device 7c for driving the heating medium 5c is arranged in the heating circuit 4c. A third direct heat exchanger 6b for giving off heat from the heating medium 5c into the vehicle interior 54 is also arranged in the heating circuit 4c.

As is evident from FIG. 1, the second direct heat exchanger 6b is designed in such a manner that it can be incorporated in the second cooling circuit 4b for discharging heat from the second coolant 5b into the surroundings 51 or into the heating circuit 4c for discharging heat from the heating medium 4c into the surroundings 51. If the second direct heat exchanger 6b is to be incorporated in the heating circuit 4c, a bypass line 30 can be incorporated in the second cooling circuit 5b by means of a valve device 31, with which the second direct heat exchanger 6b is fluidically bridged. As indicated in FIG. 1, the valve device 31 can be designed as a 3-way valve. A substantial advantage of such a configuration consists in that in the heating circuit 4c a separate expansion tank can be omitted.

In the example of FIG. 1, the condenser 11 arranged in the air conditioning circuit 20 is designed as indirect heat exchanger, by means of which heat can be transferred from the air conditioning circuit 20 into the heating circuit 4c.

Figure 2:
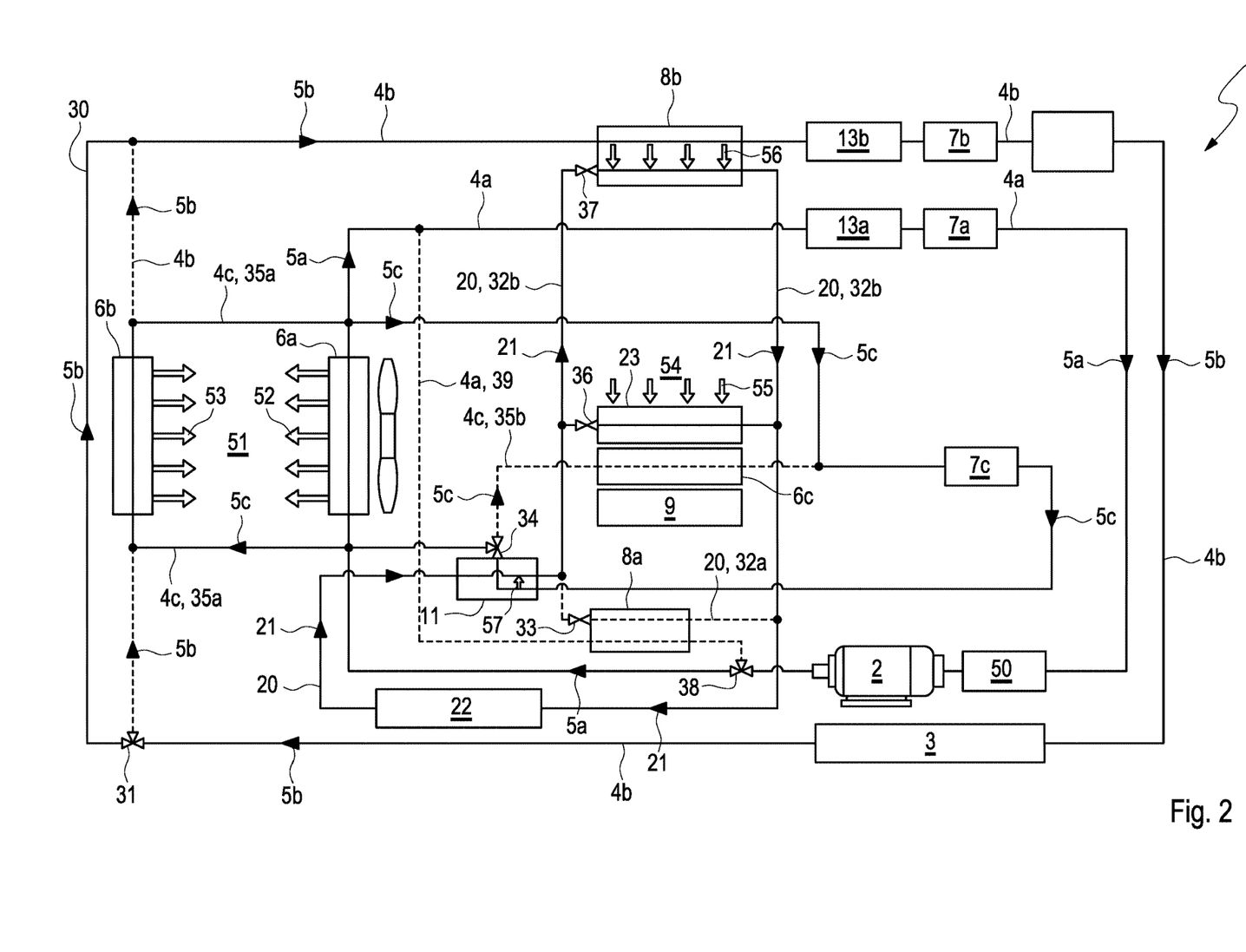

Attention is now directed at the representation of FIG. 2, which shows the waste heat utilization system 1 of FIG. 1 in a first operating state. Then, the waste heat utilization system 1 is preferentially in the first operating state when both the vehicle interior 54 and also the battery 3 are to be cooled with high ambient temperatures in the surroundings 51, typically of 40° C. or more. If the electric vehicle is in the driving mode, i.e. the electric motor 2 is active, the electric motor 2 has to be additionally cooled in the first operating state of the waste heat utilization system 1.

In the first operating state, a heat pump is realised with the help of the condenser 11, the second direct heat exchanger 6b and the second chiller 8b, with which heat can be discharged both from the battery 3 and also from the electric motor 2 as well as from the vehicle interior 54 into the surroundings 51: for cooling the battery 3, waste heat generated by the battery 3 is absorbed by the second coolant 5b circulating in the second cooling circuit. This waste heat is transferred at least partly from the second cooling circuit 4b into the air conditioning circuit 20 by means of the second chiller 8b (see arrows 56). For this purpose, the second chiller 8b is flowed through by both working medium 21 and also by the second coolant 5b. Compared with this, the first chiller 8a is not flowed through by the working medium 21. Thus, the first chiller 8a is deactivated. Such deactivation of the first chiller 8a can be effected by closing a controllable valve device 33 that is arranged in the second fluid conducting path 32b of the air conditioning circuit 20. In the first operating state of the waste heat utilization system 1 shown in FIG. 2, the valve device 33 is thus closed. Accordingly, the working medium 21 can only flow through the second fluid conducting path 32b with the second chiller 8b. Consequently, no heat exchange between the air conditioning circuit 20 and the first cooling circuit 4a takes place. This means that the first cooling circuit 4a is thermally decoupled from the air conditioning circuit 20 in the first operating state. The heat generated by the electric motor 2 or the power electronics 50 and transferred to the first coolant 5a is therefore discharged exclusively from the first direct heat exchanger 6a arranged in the first cooling circuit 4a to the surroundings 51 (see arrows 52).

As is additionally visually substantiated in FIG. 2, the working medium 21 in the first operating state of the waste heat utilization system 1, does not only absorb heat from the second cooling circuit 4b via the second chiller 8b; on the contrary, heat is additionally absorbed from the vehicle interior 54 (see arrows 55) via the evaporator 23, in order to cool the vehicle interior 54. In the condenser 11 designed as indirect heat exchanger, heat absorbed by the working medium 21 is transferred to the heating medium 5c circulating in the heating circuit 4c (see element 57 in FIG. 2). For discharging heat from the second cooling circuit 4b into the surroundings 51 of the waste heat utilization system 1, the second direct heat exchanger 6b, according to FIG. 2, is incorporated in the heating circuit 4c and be coupled from the second cooling circuit 4b so that it is flowed through by the heating medium 5c. The valve device 31 is therefore adjusted in such a manner that the second coolant 5b flows through the bypass duct 30 past the second direct heat exchanger 6b. In the first operating state, the heating circuit 4c does not function for heating the vehicle interior 54 but for discharging waste heat of the battery 3 and of heat from the vehicle interior 54 into the surroundings 51 of the waste heat utilization system 1.

By means of the second direct heat exchanger 6b, the heat absorbed by the heating medium 5c in the condenser 11 can be discharged into the surroundings 51 of the waste heat utilization system as desired (see arrows 53).

The third heat exchanger 6c arranged in the heating circuit 4c is preferentially bridged by means of a further controllable valve device 34 in such a manner that no heating medium 5c can flow through the third heat exchanger 6c. In this way, an undesirable emission of heat from the heating medium 5c into the vehicle interior 54 is prevented in the first operating state. For this purpose, the valve device 34 can be designed as a 3-way valve, by means of which the heating medium 5c leaving the condenser 11 can be conducted either in a first fluid conducting path 35a or in a second fluid conducting path 35b, which is fluidically connected parallel with the first fluid conducting path 35a. The second direct heat exchanger 6b is arranged in the first fluid conducting path 35a. The third direct heat exchanger 6c is arranged in the second fluid conducting path 35b. In the first operating state according to FIG. 1, the valve device 34 is adjusted in such a manner that the heating means 5c can exclusively flow through the first fluid conducting path 35a. Since no heating output is to be provided by the electric heating device 9 in the vehicle interior 54, the same can be switched off in the first operating state so that it does not draw any electric energy from the battery 3 as a consequence.

Figure 3:
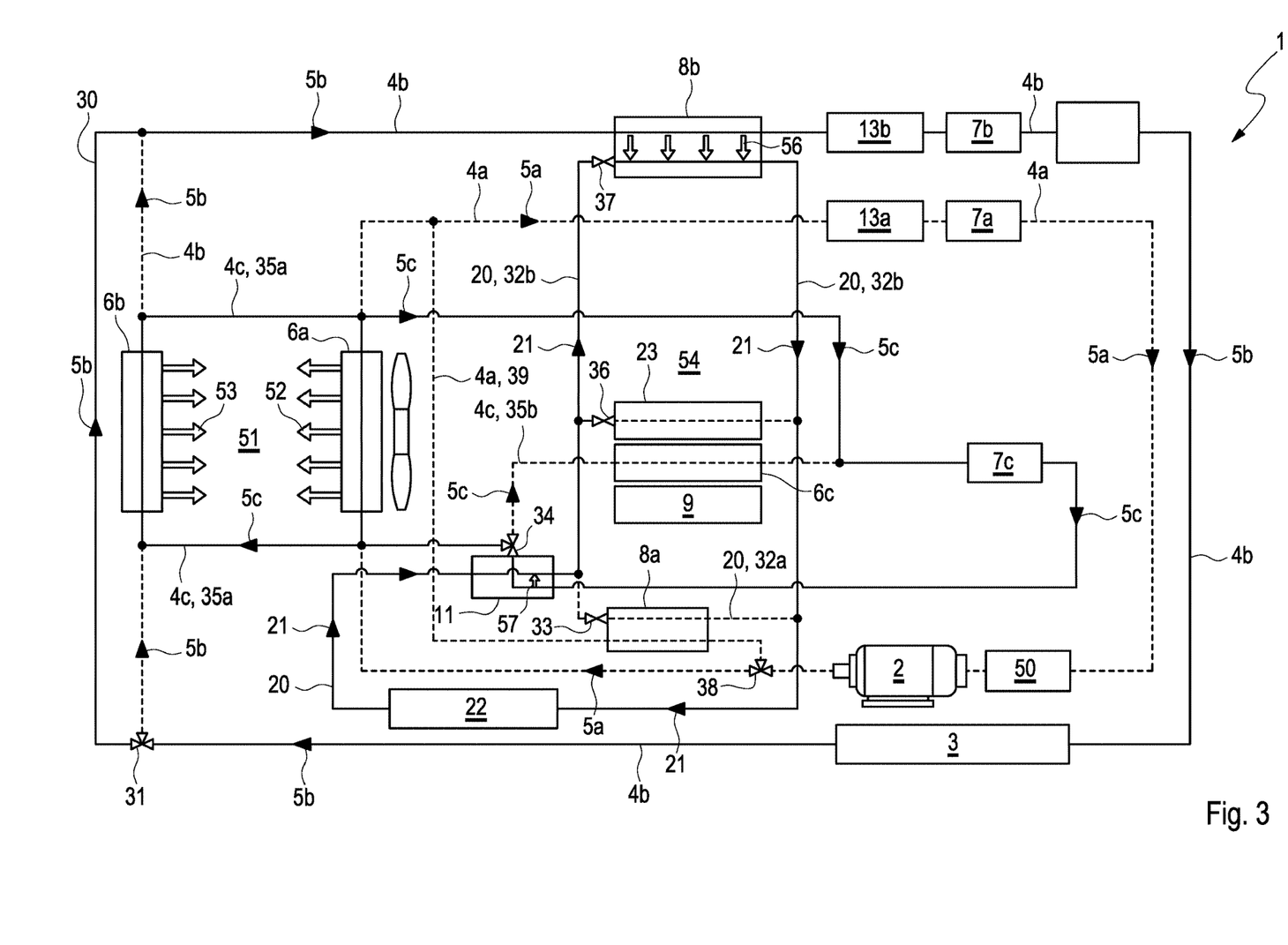

Let us now look at the representation of FIG. 3. The FIG. 3 shows the waste heat utilization system 1 in a second operating state that us distinct from the first operating state. This operating state is typically adjusted in the waste heat utilization system 1 in particular when the partly discharged or completely discharged battery 3 is to be electrically charged again on an electric charging station (not shown in the figures for the sake of clarity). In this case, the electric motor 2 of the electric vehicle parked at the charging station is typically shut off. In this case it is not normally required either to cool the vehicle interior 54 by means of the air conditioning circuit 20 since no vehicle occupant is likely to be present in the vehicle interior while the battery 3 is being charged.

The second operating state is therefore primarily intended to serve for effectively discharging waste heat generated in the battery during the course of the electrical charging process into the surroundings 51 of the waste heat utilization system 1.

Looking at the representation of FIG. 3, which shows the second operating state of the waste heat utilization system 1 in the manner of a circuit diagram it is noticeable, as the substantially only distinguishing feature compared with the first operating state that the evaporator 23 of the air conditioning circuit 1—in contrast with the first operating state—is fluidically bridged. This means that no working medium 21 is conducted through the evaporator 23. Consequently, no heat from the vehicle interior 54 is absorbed by the working medium 21 either.

As is directly evident from FIG. 3, the evaporator 23 is fluidically connected in parallel with the second chiller 8b. Upstream or downstream of the evaporator 23, a controllable valve device 36 is arranged, which in an opened state opens the evaporator 23 so that working medium 21 can flow through and in a closed state prevents working medium 21 flowing through the evaporator 23. In the second operating state the controllable valve device 36 is thus adjusted into the closed state so that the working medium 21 is conducted through the second chiller 8b which is fluidically connected in parallel with the evaporator 23. In the first operating state according to FIG. 2, the valve device 36 is accordingly adjusted into the opened state.

Since in the parked-off state of the electric vehicle the electric motor 2 does not generate any waste heat it is not necessary either to discharge waste heat generated by the electric motor 2 into the surroundings 51 by means of the first cooling circuit 4a. Consequently, the first delivery device 7a can be deactivated in the second operating state according to FIG. 3 so that no coolant circulates in the first cooling circuit 4a. In the case, for example because of excessively high ambient temperatures in the surroundings 51, a cooling of the electric motor 2 should be necessary, the first delivery device 7a can be switched on and the first cooling circuit 4a reactivated in this way. Such an optional activation of the first cooling circuit 4a is indicated in FIG.

3 by a dashed representation of the first cooling circuit 4a. The first chiller 8a is deactivated in the second operating state.

Figure 4:
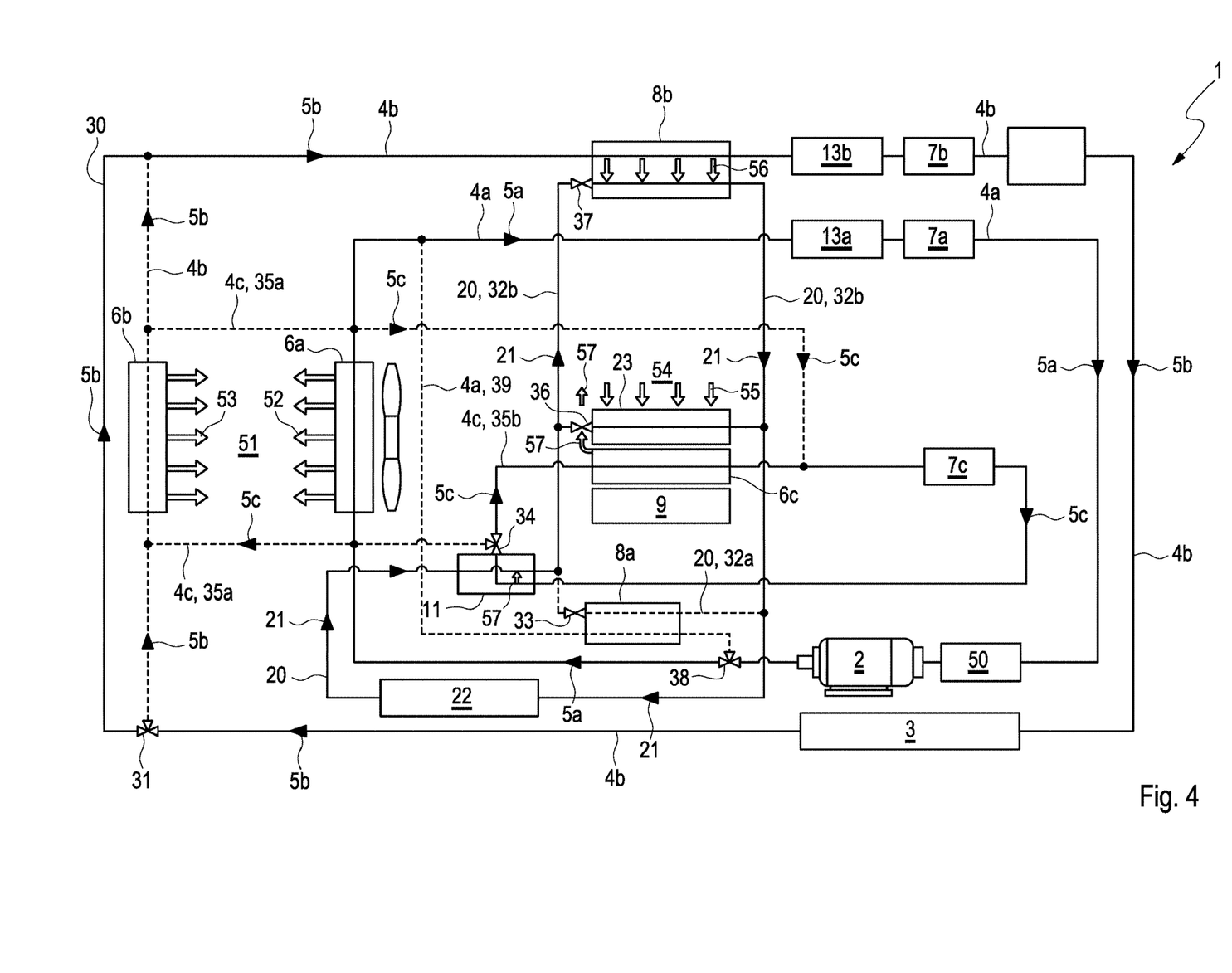

FIG. 4 shows the waste heat utilization system 1 in a further, third operating state. The third operating state is preferentially adjusted in particular when the battery 3 is to be cooled and the vehicle interior 54 heated at the same time. The ambient temperature of the surroundings 51 of the waste heat utilization system 1 in this scenario is typically lower than in the first and second operating state and can amount for example to approximately 15° C.

Comparing the representation of FIG. 3 with that of FIG. 4 it is noticeable as distinguishing feature of the third operating state relative to the second operating state that the evaporator 23—just like in the first operating state—is flowed through by the working medium 21 for absorbing heat from the vehicle interior 54 of the electric vehicle. Thus, the valve device 36 is at least partly, preferentially completely opened in the third operating state. A further distinguishing feature consists in that the third direct heat exchanger 6c arranged in the heating circuit 4c is flowed through by the heating medium 5c. To this end, the valve device 34 is adjusted in such a manner that the heating medium 5c is conducted through the second fluid conducting path 35b. Thus, heat is extracted from the heating medium 5c in the third direct heat exchanger 6c and given off to the vehicle interior 54 for heating the same (see arrow 57 in FIG. 4). In the third operating state, the heating circuit 4c is thus utilised for heating the vehicle interior 54.

In the case that by means of the second chiller 8b more heat is transferred from the second coolant 5b of the second cooling circuit 8b to the working medium 21 of the air conditioning circuit 20 than is required for heating the vehicle interior, the second direct heat exchanger 6b can be switched into the heating circuit 4c for discharging excess heat from the heating circuit 5c into the surroundings 51 of the waste heat utilization system when required. This is indicated in FIG. 4 by a dashed line representation of the first fluid conducting path 35a of the heating circuit 4c, in which the second direct heat exchanger is arranged. Such an additional activation can be effected by suitably adjusting the valve device 34 in such a manner that the heating medium 50c can also enter the first fluid conducting path 35a with the second direct heat exchanger 6b. The first chiller 8a is also deactivated in the third operating state.

Figure 5:
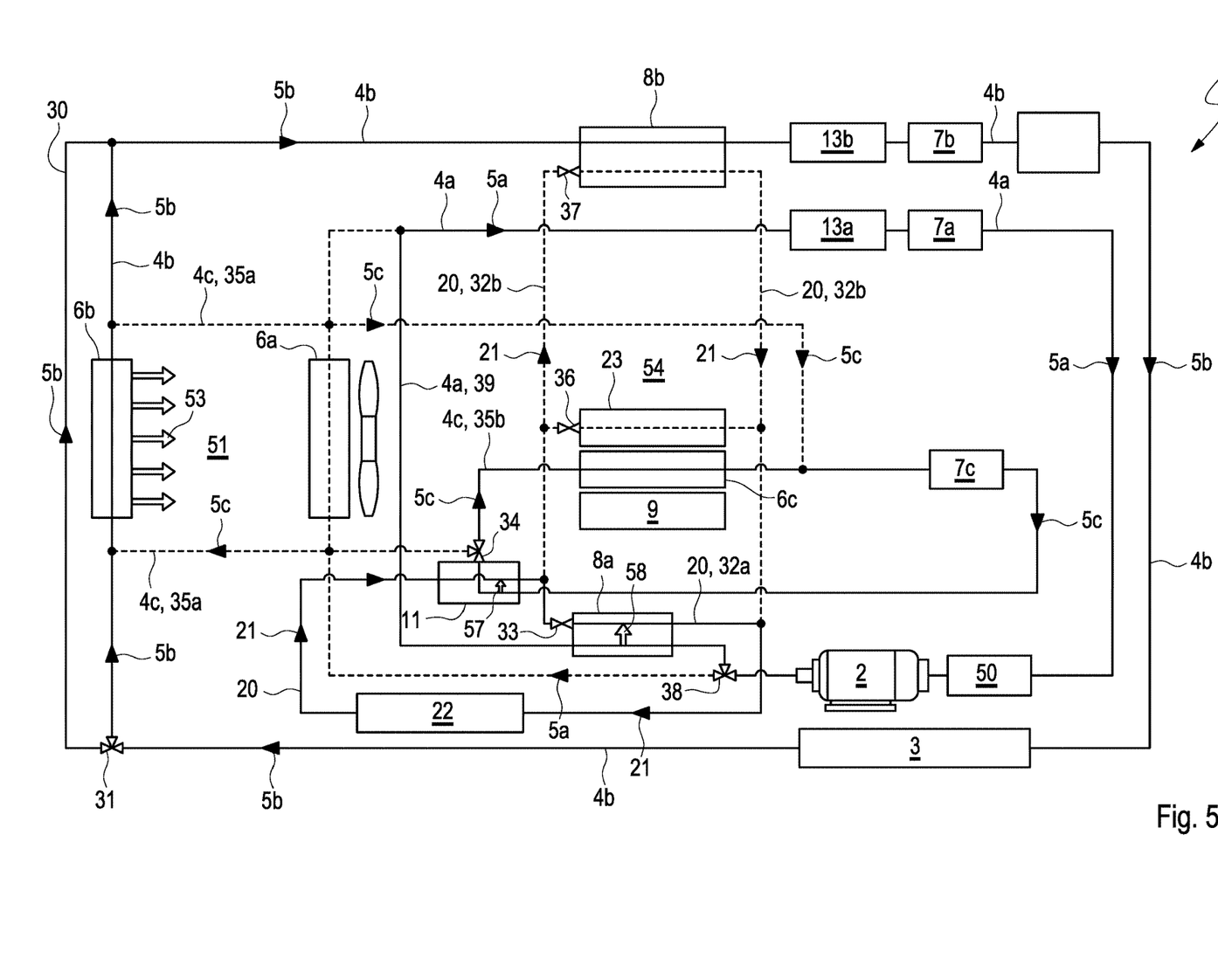

FIG. 5 shows the waste heat utilization system 1 in a further, fourth operating state. The fourth operating state is preferably adjusted in the waste heat utilization system 1 in particular when because of low ambient temperatures in the surroundings 51 of the waste heat utilization system 1, for example of approximately −10° C. or less, the vehicle interior 54 of the electric vehicle is to be heated. In the fourth operating state it is possible to transfer the waste heat generated by the electric motor 2 during the operation into the vehicle interior 54. In contrast with the first, second and third operating state, the first chiller 8a is active in the fourth operating state. The valve device 33 is thus adjusted into an opened state so that the working medium 21 can flow through the first chiller 8a. The first chiller 8a then transfers the heat given off to the coolant 5 by the electric motor 2 to the working medium 21 circulated in the cooling circuit 20 (see arrow 58 in FIG. 5). In contrast with this, the second chiller 8b is deactivated so that no heat from the second coolant 5b is transferred to the working medium 21. For deactivating the second chiller 8b, a further controllable valve device 37 can be arranged upstream or downstream of the same. The valve device 37 is adjustable between an opened and a closed position. In the closed state according to FIG. 5, the valve device 37 prevents working medium 21 to flow through the second chiller 8b. In the first, second and third operating state, the valve device 37 is in the opened state (see FIGS. 2, 3 and 4).

Since the vehicle interior 54 is to be heated, the evaporator 23 arranged in the air conditioning circuit 20 is fluidically bridged in the fourth operating state so that no working medium 21 flows through the evaporator 23. In this way it is prevented that heat is extracted from the vehicle interior 54 to be heated.

Apart from this, the condenser 11 arranged in the air conditioning circuit at least partly transfers the heat absorbed from the working medium 21 via the first chiller 8a to the heating medium 5c conducted through the heating circuit 4c.

Since in the fourth operating state the third direct heat exchanger 6c arranged in the heating circuit 4c is flowed through by the heating medium, heat for giving off to the vehicle interior 54 can be extracted from the heating medium 5c in the third heat exchanger 6c. In this way, the vehicle interior 54 can be heated as desired. In the case that the quantity of heat made available by the third heat exchanger 6c to the vehicle interior 54 is not sufficient, the electric heating device 9 can be additionally activated.

Figure 6:
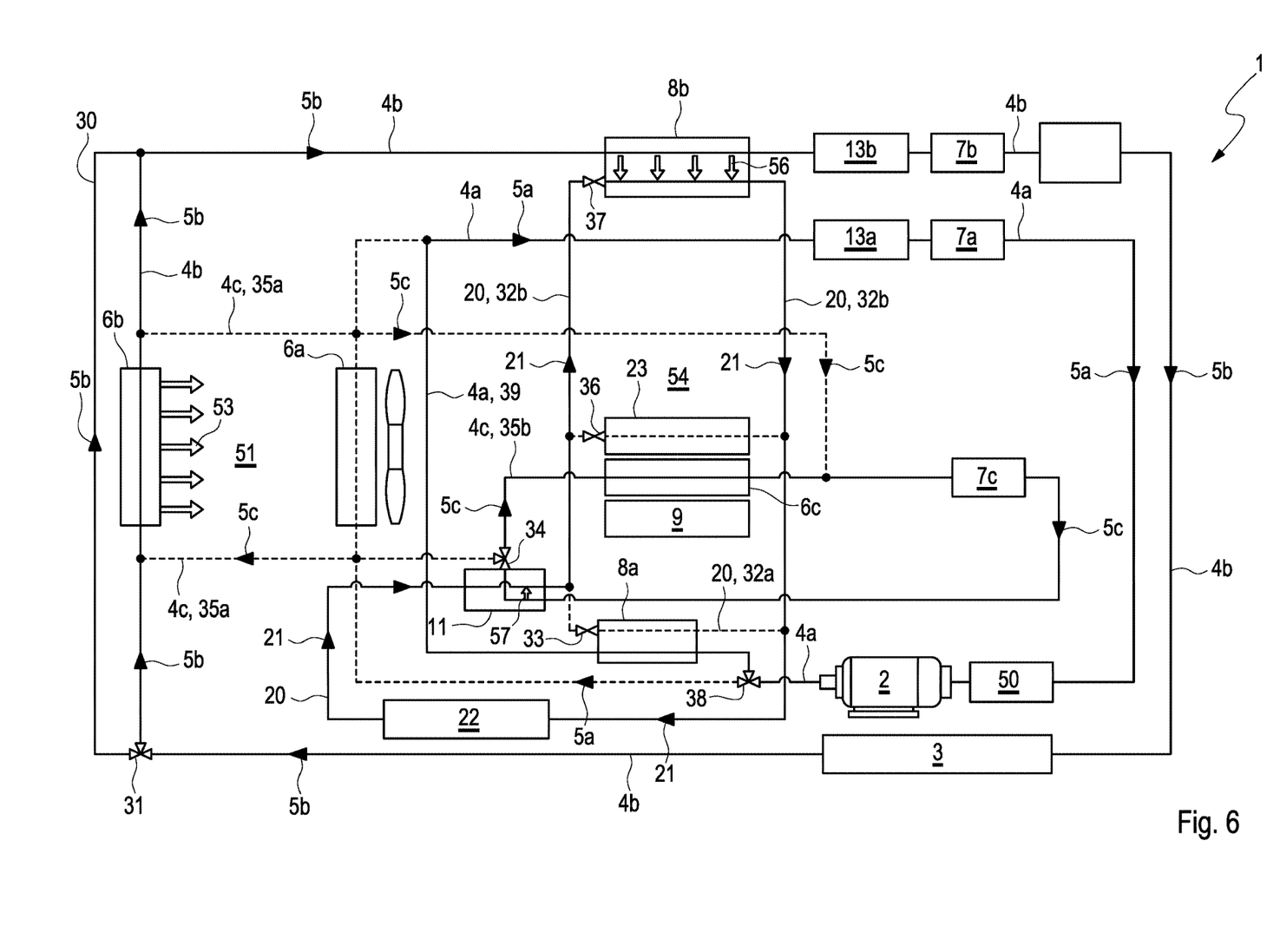

FIG. 6 shows the waste heat utilization system 1 in a further, fifth operating state. Like the fourth operating state, the fifth operating state is preferentially adjusted in particular when because of low ambient temperatures in the surroundings 51 of the waste heat utilization system 1, for example of approximately −10° C. or less, the vehicle interior 54 of the electric vehicle is to be heated. However, in the fifth operating state it is not the waste heat generated by the electric motor 2 during the operation that is transferred into the vehicle interior 54, but the heat that is stored in the battery 3.

This is a possible version in particular when the electric motor 2 following the parking-off of the electric vehicle has been switched off and thus no longer generates any waste heat that could be fed to the vehicle interior 54. Since the battery 3 because of its high mass typically has a very high heat capacity and can thus act as heat accumulator, the energy stored in the battery 3—at least to a limited extent, can be utilised for heating the vehicle interior 54. The fifth operating state therefore serves for transferring heat from the battery 3 into the vehicle interior. The fifth operating state therefore differs from the fourth operating state in that on the one hand the second chiller 8b transfers heat from the second coolant 5b to the working medium 21. On the other hand, the first chiller 8a is deactivated so that no heat from the first coolant 5a is transferred to the working medium 21. Accordingly, the valve device 33 is in the closed state and the valve device 37 in the opened state. The second chiller 8b thus transfers the heat given off the first coolant 5a by the battery 3 to the working medium 21 that circulates in the cooling circuit 20 (see arrows 58 in FIG. 6).

Analogous to the fourth operating state, the condenser 11 arranged in the air conditioning circuit 20 at least partly transfers the heat absorbed from the working medium 21 via the second chiller 8b, also in the fifth operating state, on to the heating medium 5c conducted through the heating circuit 4c. Since, also in the fifth operating state, the third direct heat exchanger 6c arranged in the heating circuit 4c is flowed through by the heating medium 5c, heat to be given off to the vehicle interior 54 can be extracted from the heating medium 5c in the third heat exchanger 6c. In this way, the vehicle interior 54 is heated as desired. In the case that the quantity of heat provided to the vehicle interior 54 by the third heat exchanger 6c is not sufficient, the electric heating device 9 can also be additionally activated in the fifth operating state.

In the fourth and in the fifth operating state, the first direct heat exchanger 6a is fluidically bridged by means of a controllable valve device 38 designed as 3-way valve, interacting with a bypass line 39, so that no first coolant 5a flows through the first direct heat exchanger 6a. Accordingly, no heat can be given off to the surroundings 51 of the waste heat utilization system 1 either. In this way, it is ensured in the fourth operating state according to FIG. 5 that a heat transfer from the first coolant 5a to the working medium 21 takes place exclusively via the first chiller 8a. In the fifth operating state according to FIG. 6, an undesirable discharge of heat from the first cooling circuit 4a is also prevented in this way.

It is to be understood that the waste heat utilization system 1 according to the invention, further operating states which have not been discussed in more detail can be adjusted alternatively or in addition to the five operating states explained above.

For adjusting or switching over between two or more operating states, the waste heat utilization system 1 can be equipped with a control/regulating device which is not shown in more detail in the figures, by means of which the waste heat utilization system 1 can be switched over between at least two operating states. For switching over between the operating states, the control/regulating device can activate the valve devices 31, 33, 34, 36, 37, 38 explained above. For adjusting one of the five operating states explained above, the valve devices 31, 33, 34, 36, 37 and 38 can be adjusted by means of suitable activation by the control/regulating device as explained above. Here, the activation or adjustment of the valve devices can be activated as a function of at least one operating parameter of the waste heat utilization system 1 such as for example the waste heat generated by the battery per unit time and as a function of at least one ambient parameter of the waste heat utilization system 1 such as for example the ambient temperature in the surroundings 51 of the waste heat utilization system 1.

"Direct heat exchanger" here is to mean a heat exchanger by means of which heat can be exchanged between the respective coolant 5a, 5b or the heating medium 5c and the air that is present in the surroundings 51 or in the vehicle interior 54.

The term "indirect heat exchanger" here is to mean a heat exchanger by means of which heat can be exchanged between the working medium 21 circulating in the air conditioning circuit 20 and the first coolant 5a or the second coolant 5b or the heating medium 5c. A direct heat exchange with the air that is present in the surroundings 51 and in the vehicle interior 54 does not take place.

"Chiller" 8a, 8b here it so mean a heat exchanger by means of which heat can be transferred from the first or second coolant 5a, 5b to the working medium 21 of the air conditioning circuit 20.

Figure 7:
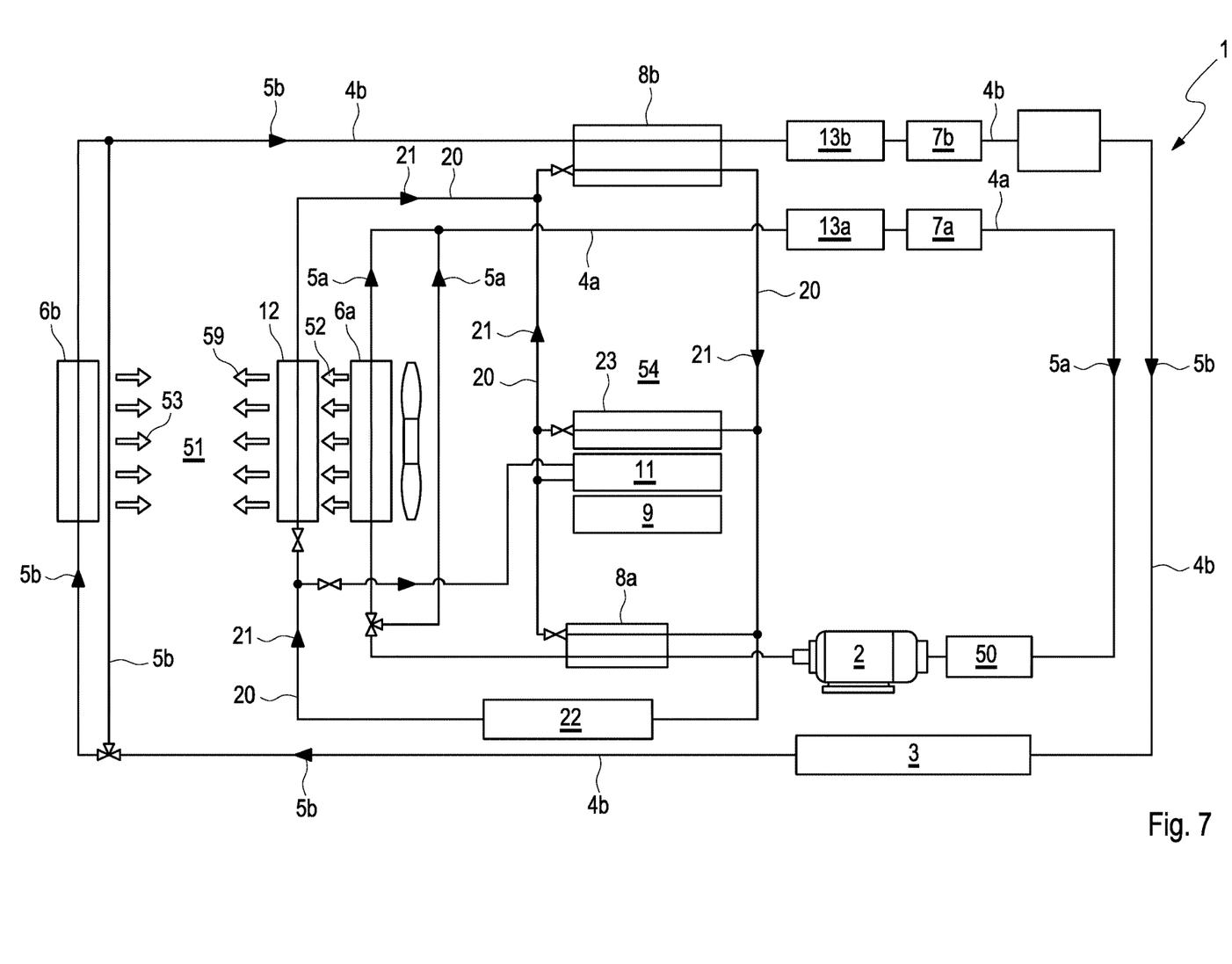

FIG. 7 shows a second exemplary embodiment of the waste heat utilization system 1 of the FIGS. 1 to 6. In the example of FIG. 7, the condenser 11 arranged in the air conditioning circuit 20 is not embodied as indirect condenser but as direct condenser. This allows using the condenser 11 as heating element in order to heat the vehicle interior 54. To this end, heat is extracted in the condenser 11 from the working medium flowing through the air conditioning circuit 20 and directly fed to the vehicle interior 54.

A further condenser 12 can serve for giving off excess heat, which is not needed for heating the vehicle interior 54, to the surroundings 51 of the waste heat utilization system 1 (see arrows 59 in FIG. 7).

The invention claimed is:

1. A waste heat utilization system for an electric vehicle, which includes an electric motor for driving the electric vehicle and a battery for supplying the electric motor with electric energy, comprising:
    a first cooling circuit for cooling the electric motor, wherein in the first cooling circuit during operation of the waste heat utilization system a first coolant circulates, and wherein in the first cooling circuit are arranged:
    the electric motor;
    a first heat exchanger for discharging heat from the first coolant to outside of the waste heat utilization system; and
    a first coolant driver;
    a second cooling circuit for cooling the battery, wherein in the second cooling circuit during the operation of the waste heat utilization system a second coolant circulates, and wherein in the second cooling circuit are arranged:
    the battery;
    a second heat exchanger for discharging heat from the second coolant to outside of the waste heat utilization system; and
    a second coolant driver;
    an air conditioning circuit for air conditioning a vehicle interior of the electric vehicle, wherein in the air conditioning circuit during the operation of the waste heat utilization system a working medium circulates, and wherein in the air conditioning circuit are arranged:
    a compressor for compressing the working medium;
    a condenser for condensing the working medium; and
    an evaporator for evaporating the working medium;
    a first chiller configured to transfer heat from the first cooling circuit into the air conditioning circuit; and
    a second chiller configured to transfer heat from the second cooling circuit into the air conditioning circuit.

2. The waste heat utilization system according to claim 1, further comprising an electric heating device for electrically heating the vehicle interior of the electric vehicle.

3. The waste heat utilization system according to claim 1, wherein the condenser is designed as a direct heat exchanger by which heat from the air conditioning circuit is transferrable to outside of the waste heat utilization system.

4. The waste heat utilization system according to claim 1, further comprising:
    a heating circuit in which a heating medium circulates; and
    a heating medium driver, and a third heat exchanger arranged in the heating circuit for giving off heat from the heating medium into the vehicle interior;
    wherein the condenser is designed as an indirect heat exchanger by which heat is transferrable from the air conditioning circuit into the heating circuit.

5. The waste heat utilization system according to claim 4, wherein the waste heat utilization system is adjustable to an operating state in which:
    the condenser transfers heat from the working medium to the heating medium;
    the second heat exchanger is incorporated in the heating circuit such that the heating medium is flowable therethrough;

the third heat exchanger is bridged so that no heating medium is flowable therethrough;
the first chiller is fluidically bridged so that no heat exchange takes place between the air conditioning circuit and the first cooling circuit;
the evaporator is flowed through by the working medium; and
the second chiller is flowed through by the second coolant and by the working medium so that heat is transferred from the second coolant to the working medium.

6. The waste heat utilization system according to claim 4, wherein the waste heat utilization system is adjustable to an operating state in which:
the second chiller transfers heat from the second coolant to the working medium;
the condenser transfers heat from the working medium to the heating medium;
the second heat exchanger is incorporated in the heating circuit such that the heating medium is flowable therethrough;
the third heat exchanger is fluidically bridged so that no heating medium flows through the third heat exchanger;
the first chiller is fluidically bridged so that no heat exchange between the air conditioning circuit and the first cooling circuit takes place; and
the evaporator is fluidically bridged so that no working medium flows through the evaporator.

7. The waste heat utilization system according to claim 6, wherein, in the operating state, the first coolant driver is deactivated so that in the first cooling circuit no first coolant circulates.

8. The waste heat utilization system according to claim 4, wherein the waste heat utilization system is adjustable to an operating state in which:
the second chiller transfers heat from the second coolant to the working medium, and the first chiller is deactivated;
the condenser transfers heat from the working medium to the heating medium;
the evaporator is flowed through by the working medium for absorbing heat from the vehicle interior; and
the third heat exchanger is flowed through by the heating medium so that heat for giving off to the vehicle interior is extracted from the heating medium in the third heat exchanger.

9. The waste heat utilization system according to claim 8, wherein, in the operating state, the second heat exchanger is switched into the heating circuit.

10. The waste heat utilization system according to claim 4, wherein the waste heat utilization system is adjustable to an operating state in which:
the first chiller transfers heat from the first coolant to the working medium;
the second chiller is deactivated so that no heat is transferred from the second coolant to the working medium;
the condenser transfers heat from the working medium to the heating medium;
the evaporator is fluidically bridged so that no working medium flows through the evaporator; and
the third heat exchanger is flowed through by the heating medium so that heat for giving off to the vehicle interior is extracted from the heating medium in the third heat exchanger.

11. The waste heat utilization system according claim 4, wherein the waste heat utilization system is adjustable to an operating state in which:
the second chiller transfers heat from the second coolant to the working medium;
the first chiller is deactivated so that no heat is transferred from the first coolant to the working medium;
the condenser transfers heat from the working medium to the heating medium;
the evaporator is fluidically bridged so that no working medium flows through the evaporator; and
the third heat exchanger is flowed through by the heating medium so that heat for giving off to the vehicle interior is extracted from the heating medium in the third heat exchanger.

12. The waste heat utilization system according to claim 10, wherein the first heat exchanger is bridged in the operating state so that no first coolant flows through the first heat exchanger.

13. The waste heat utilization system according to claim 1, further comprising:
a regulator by which the waste heat utilization system is switchable between at least two operating states; and
a plurality of valve devices, at least one of which is adjustable.

14. An electric vehicle, comprising:
an electric motor and a battery for supplying the electric motor with electric energy; and
a waste heat utilization system operatively connected with at least one of the electric motor and the battery for discharging waste heat, the waste heat utilization system:
a first cooling circuit for cooling the electric motor, wherein in the first cooling circuit during operation of the waste heat utilization system a first coolant circulates, and wherein in the first cooling circuit are arranged:
the electric motor;
a first heat exchanger for discharging heat from the first coolant to outside of the waste heat utilization system; and
a first coolant driver;
a second cooling circuit for cooling the battery, wherein in the second cooling circuit during the operation of the waste heat utilization system a second coolant circulates, and wherein in the second cooling circuit are arranged:
the battery;
a second heat exchanger for discharging heat from the second coolant to outside of the waste heat utilization system; and
a second coolant driver;
an air conditioning circuit for air conditioning a vehicle interior of the electric vehicle, wherein in the air conditioning circuit during the operation of the waste heat utilization system a working medium circulates, and wherein in the air conditioning circuit are arranged:
a compressor for compressing the working medium;
a condenser for condensing the working medium; and
an evaporator for evaporating the working medium;
a first chiller configured to transfer heat from the first cooling circuit into the air conditioning circuit; and
a second chiller configured to transfer heat from the second cooling circuit into the air conditioning circuit.

15. The electric vehicle claim 14, further comprising:
a heating circuit in which a heating medium circulates; and
a heating medium driver, and a third heat exchanger arranged in the heating circuit for giving off heat from the heating medium into the vehicle interior;

wherein the condenser is designed as an indirect heat exchanger by which heat is transferrable from the air conditioning circuit into the heating circuit.

16. The electric vehicle according to claim 15, wherein the waste heat utilization system is adjustable to a first operating state in which:
- the condenser transfers heat from the working medium to the heating medium;
- the second heat exchanger is incorporated in the heating circuit such that the heating medium is flowable therethrough;
- the third heat exchanger is bridged so that no heating medium is flowable therethrough;
- the first chiller is fluidically bridged so that no heat exchange takes place between the air conditioning circuit and the first cooling circuit;
- the evaporator is flowed through by the working medium; and
- the second chiller is flowed through by the second coolant and by the working medium so that heat is transferred from the second coolant to the working medium.

17. The electric vehicle according to claim 16, wherein the waste heat utilization system is adjustable to a second operating state in which:
- the second chiller transfers heat from the second coolant to the working medium;
- the condenser transfers heat from the working medium to the heating medium;
- the second heat exchanger is incorporated in the heating circuit such that the heating medium is flowable therethrough;
- the third heat exchanger is fluidically bridged so that no heating medium flows through the third heat exchanger;
- the first chiller is fluidically bridged so that no heat exchange between the air conditioning circuit and the first cooling circuit takes place; and
- the evaporator is fluidically bridged so that no working medium flows through the evaporator.

18. The electric vehicle of claim 17, wherein the waste heat utilization system is adjustable to a third operating state in which:
- the second chiller transfers heat from the second coolant to the working medium, and the first chiller is deactivated;
- the condenser transfers heat from the working medium to the heating medium;
- the evaporator is flowed through by the working medium for absorbing heat from the vehicle interior; and
- the third heat exchanger is flowed through by the heating medium so that heat for giving off to the vehicle interior is extracted from the heating medium in the third heat exchanger.

19. The electric vehicle claim 18, wherein the waste heat utilization system is adjustable to a fourth operating state in which:
- the first chiller transfers heat from the first coolant to the working medium;
- the second chiller is deactivated so that no heat is transferred from the second coolant to the working medium;
- the condenser transfers heat from the working medium to the heating medium;
- the evaporator is fluidically bridged so that no working medium flows through the evaporator; and
- the third heat exchanger is flowed through by the heating medium so that heat for giving off to the vehicle interior is extracted from the heating medium in the third heat exchanger.

20. The electric vehicle claim 19, wherein the waste heat utilization system is adjustable to a fifth operating state in which:
- the second chiller transfers heat from the second coolant to the working medium;
- the first chiller is deactivated so that no heat is transferred from the first coolant to the working medium;
- the condenser transfers heat from the working medium to the heating medium;
- the evaporator is fluidically bridged so that no working medium flows through the evaporator; and
- the third heat exchanger is flowed through by the heating medium so that heat for giving off to the vehicle interior is extracted from the heating medium in the third heat exchanger.

* * * * *